(12) United States Patent
Heo

(10) Patent No.: US 11,608,105 B2  
(45) Date of Patent: Mar. 21, 2023

(54) DUST CAP FOR STEERING SYSTEM

(71) Applicant: HL MANDO CORPORATION, Pyeongtaek-si (KR)

(72) Inventor: Ilkwon Heo, Anyang-si (KR)

(73) Assignee: HL MANDO CORPORATION, Pyeongiaek-si (KR)

( * ) Notice: Subject to any disclaimer, the term of this patent is extended or adjusted under 35 U.S.C. 154(b) by 0 days.

(21) Appl. No.: 17/312,532

(22) PCT Filed: Dec. 10, 2019

(86) PCT No.: PCT/KR2019/017341  
§ 371 (c)(1),  
(2) Date: Jun. 10, 2021

(87) PCT Pub. No.: WO2020/122538  
PCT Pub. Date: Jun. 18, 2020

(65) Prior Publication Data  
US 2022/0055680 A1 Feb. 24, 2022

(30) Foreign Application Priority Data  
Dec. 10, 2018 (KR) .................. 10-2018-0158243

(51) Int. Cl.  
*B62D 1/20* (2006.01)  
*B62D 3/12* (2006.01)

(52) U.S. Cl.  
CPC ............... *B62D 1/20* (2013.01); *B62D 3/12* (2013.01); *B60Y 2306/09* (2013.01)

(58) Field of Classification Search  
CPC ... B62D 1/20; B62D 3/12; B62D 1/16; B60Y 2306/09; B60R 13/0846  
See application file for complete search history.

(56) References Cited

U.S. PATENT DOCUMENTS 7,641,561 B2 * 1/2010 Moriyama ............... B62D 1/16  
                                                280/780  
2015/0003901 A1 * 1/2015 Yamaguchi ............ B62D 1/20  
                                                403/288  
(Continued)

FOREIGN PATENT DOCUMENTS

CN         206598874 U     10/2017  
CN         206598874 U * 10/2017  
(Continued)

OTHER PUBLICATIONS

Machine Translation of KR20150111622 (Year: 2015).*  
(Continued)

*Primary Examiner* — Paul N Dickson  
*Assistant Examiner* — Kurtis Nielson  
(74) *Attorney, Agent, or Firm* — Hauptman Ham, LLP

(57) ABSTRACT

A dust cap for a steering system is disclosed. A dust cap for a steering system, which has an accommodation hole for accommodating a pinion shaft and of which the lower part is coupled to a rack housing, according to an embodiment of the present invention comprises: a floor surface which extends from the upper part toward the outer side of the accommodation hole; a first rim forming a lateral wall on the edge of the floor surface; a second rim forming an intermediate wall between the first rim and the accommodation hole; and one or more slits insert-formed from the second rim toward the floor surface.

8 Claims, 2 Drawing Sheets

(56) References Cited

U.S. PATENT DOCUMENTS

| | | | | |
|---|---|---|---|---|
| 2017/0146129 A1* | 5/2017 | Allen | ............... | F16J 15/3252 |
| 2018/0334111 A1* | 11/2018 | Lee | ............ | F16H 57/028 |

FOREIGN PATENT DOCUMENTS

| | | | | | |
|---|---|---|---|---|---|
| DE | 102016121929 A1 | * | 6/2017 | ............ | B62D 1/16 |
| JP | 09-042467 A | | 2/1997 | | |
| JP | 2013-216292 A | | 10/2013 | | |
| JP | 2013216292 A | * | 10/2013 | | |
| JP | 2018069864 A | * | 5/2018 | | |
| JP | 2020199991 A | * | 12/2020 | | |
| KR | 20090094426 A | * | 9/2009 | | |
| KR | 10-1042401 B1 | | 6/2011 | | |
| KR | 10-1345859 B1 | | 12/2013 | | |
| KR | 101345859 B1 | * | 12/2013 | | |
| KR | 20140048531 A | * | 4/2014 | | |
| KR | 10-2015-0111622 A | | 10/2015 | | |
| KR | 20150111622 A | * | 10/2015 | | |
| KR | 10-2016-0118713 A | | 10/2016 | | |
| KR | 101706467 B1 | * | 2/2017 | | |
| KR | 20170056287 A | * | 5/2017 | | |
| KR | 101871337 B1 | * | 6/2018 | | |
| KR | 20180102292 A | * | 9/2018 | | |
| KR | 10-2075049 B1 | | 2/2020 | | |
| KR | 10-2020-0070751 A | | 6/2020 | | |

OTHER PUBLICATIONS

Machine Translation of KR101871337 (Year: 2018).*
Machine Translation of KR101345859 (Year: 2013).*
Machine Translation of JP2013216292 (Year: 2013).*
International Search Report dated Apr. 3, 2020 for corresponding international application No. PCT/KR2019/017341.
Written Opinion issued for corresponding International Patent Application No. PCT/KR2019/017341 dated Apr. 3, 2020.

* cited by examiner

DUST CAP FOR STEERING SYSTEM

CROSS-REFERENCE TO RELATED APPLICATION

The present application is a national stage filing under 35 U.S.C § 371 of PCT application number PCT/KR2019/017341 filed on Dec. 10, 2019 which is based upon and claims the benefit of priorities to Korean Patent Application No. 10-2018-0158243 filed on Dec. 10, 2018, in the Korean Intellectual Property Office. Both of the aforementioned applications are hereby incorporated by reference in their entireties.

TECHNICAL FIELD

The present invention relates to a dust cap for a steering system having an improved structure.

BACKGROUND ART

A steering wheel (handle) of a vehicle is coupled to one end of a pinion shaft to transmit a rotational force by steering of a driver to the pinion shaft, and a pinion gear formed at the other end of the pinion shaft is engaged with a rack gear to transmit the rotational force to wheels of the vehicle.

Here, the engaged parts of the pinion gear and the rack gear may be accommodated in a rack housing and an intermediate part of the pinion shaft may be accommodated in a dust cap of which a lower part is coupled to the rack housing.

An upper part of the dust cap is coupled to a dashboard of a vehicle, and one end of the pinion shaft which protrudes from the dust cap is exposed to the outside of the dashboard to be coupled to the steering wheel.

Japanese Unexamined Patent Application Publication No. 1997-42467 (Title of the invention: "Column hole cover") and Korea Patent Registration No. 10-1042401 (Title of the invention: "Dust cap assembly for power steering system of vehicle") publish a general structure of the steering system.

The conventional technology includes a dust cover or a dust packing between a dashboard and a dust cap to prevent foreign substances from being introduced, but rust may be caused in the lower rack-pinion gear stage when moisture is introduced along the pinion shaft.

In this case, because vibration and noise may be caused when the steering system is operated or a problem may be caused in a steering function, a large accident may occur during driving of a vehicle.

Technical Problem

The present invention is directed to providing a dust cap for a steering system having an improved structure which can prevent introduction of foreign substances or moisture that may flow into an interior of a rack housing along a pinion shaft.

Technical Solution

One aspect of the present invention provides a dust cap for a steering system, which has an accommodation hole for accommodating a pinion shaft and of which a lower part is coupled to a rack housing, the dust cap including a floor surface formed to extend to an outside of the accommodation hole from an upper part thereof, a first rim configured to form an outer wall at an edge of the floor surface, a second rim configured to form an intermediate wall between the first rim and the accommodation hole, and one or more slits recessed toward the floor surface from the second rim.

Here, the accommodation hole may be formed to be higher than a height of the first rim or the second rim with respect to the floor surface.

Further, the dust cap for a steering system may be coupled to a dashboard and the accommodation hole may be formed at a height exposed above the dashboard.

Further, the floor surface may be disposed to have a predetermined angle with respect to a bottom of a vehicle body, and the slits may be formed in a direction that is close to the bottom of the vehicle body in the second rim.

Further, one or more vent holes may be formed in the floor surface between the first rim and the second rim.

Further, the vent holes may be formed in the same direction as a circumferential direction formed by a rotational axis of the pinion shaft and the slits.

Further, the slits may be formed to be recessed in the second rim such that a depth of each of the slits is the same as a depth of the floor surface.

Further, a width of each of the slits may become smaller toward the first rim.

Further, two or more coupling protrusions of a hook shape may be formed in an outward direction of the first rim and a dust packing may be coupled to the coupling protrusions to shield a space formed by the first rim and the second rim.

Further, the dust packing may be formed of a rubber material and an upper surface of the dust packing may be formed in a wrinkled shape.

Advantageous Effects

According to the present invention moisture or foreign substances, which may be introduced into the interior of a rack housing along a pinion shaft, can be discharged to the outside, through organic coupling of a height of an accommodation hole which is formed in an upper part of a dust cap, shapes of a first rim and a second rim, vent holes formed on a floor surface, and the dust cover, thereby improving the durability of a steering system and reducing noise and vibration.

MODES OF THE INVENTION

Figure 1:
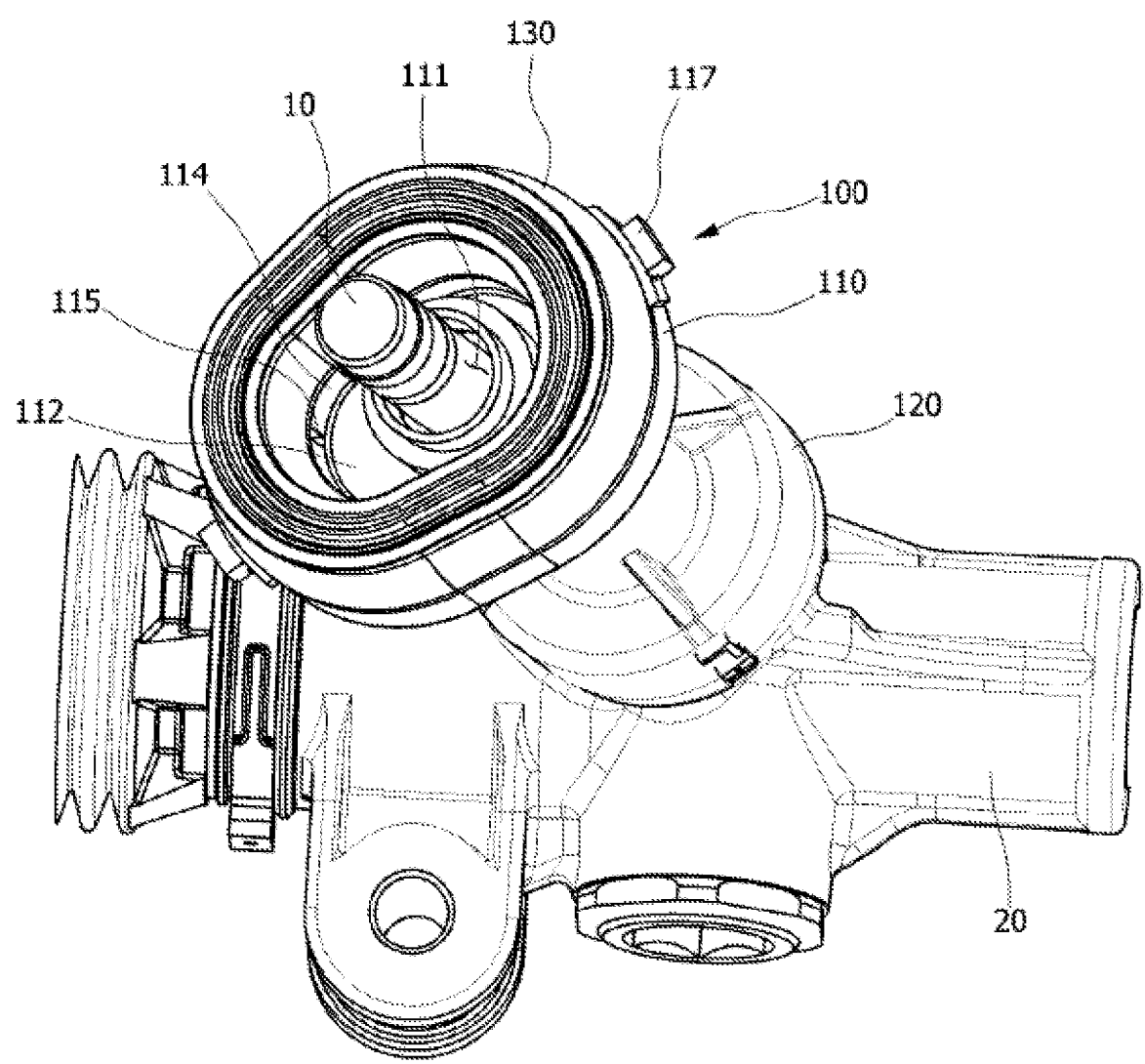
FIG. 1 is a view illustrating a part of a steering system including a dust cap according to an embodiment of the present invention.

Hereinafter, an exemplary embodiment of the present invention will be described in detail with reference to the accompanying drawings.

Unless particularly defined, all the terms of the specification mean general meanings of the terms understood by an ordinary person in the art, and when the terms used in the specification are contradictory to the general meanings of the terms, their meanings follow the definitions used in the specification.

However, the invention that will be in the following is provided only to describe the embodiment of the present invention and is not intended to limit the scope of the present invention, and the reference numerals used to be the same throughout the specification denote the same elements.

Figure 2:
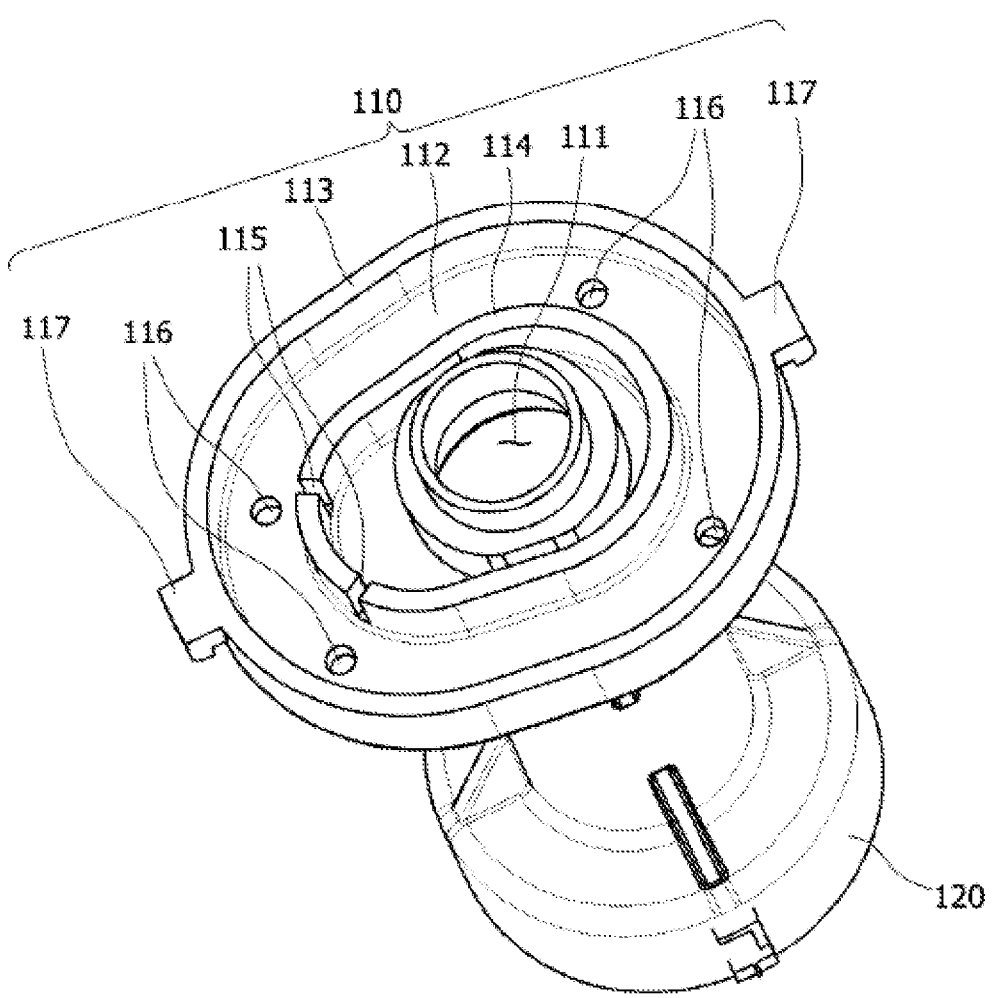
FIG. 2 is a perspective view of the dust cap of FIG. 1 from which a dust packing is removed.

FIG. 1 is a view illustrating a part of a steering system including a dust cap according to an embodiment of the present invention, and FIG. 2 is a perspective view of the dust cap of FIG. 1 from which a dust packing is removed.

Referring to FIGS. 1 and 2, a dust cap 100 according to an embodiment of the present invention may have an accommodation hole 111 for accommodating a pinion shaft 10 and a lower part 120 thereof may be coupled to a rack housing 20.

The pinion shaft 10 may be connected to a steering wheel (handle) of a vehicle to receive a rotational force by steering of a driver.

The rotational force transmitted to the pinion shaft 10 is transmitted to wheels of a vehicle by a pinion gear formed in the other end of the pinion shaft 10 through a rack gear.

Here, engaged parts of the pinion gear and the rack gear may be accommodated in the rack housing 20, and an intermediate part of the pinion shaft 10 may be accommodated in the dust cap 100 according to the present invention, of which the lower part 120 is coupled to the rack housing 20.

An upper part 110 of the dust cap 100 is coupled to a dashboard (not illustrated) of a vehicle, and one end of the pinion shaft 10, which protrudes from the dust cap 100, is exposed to the outside of the dashboard to be coupled to the steering wheel (handle) which is not illustrated.

The upper part 110 of the dust cap 100 according to the embodiment of the present invention may effectively block foreign substances and/or a fluid and may include an effective discharge structure for the introduced foreign substances and/or fluid.

In detail, the upper part 110 of the dust cap 100 according to the embodiment of the present invention may include a floor surface 112, a first rim 113, a second rim 114, and slits 115 and may include vent holes 116.

The floor surface 112 may extend from the upper part 110 of the dust cap 100 to the outside of the accommodation hole 111. The floor surface 112 may be disposed in the upper part 110 of the dust cap 100 to be parallel to or form a predetermined angle with respect to a direction that is perpendicular to a longitudinal direction of the accommodation hole 111, that is, a circumferential direction of the pinion shaft 10.

The first rim 113 may form an outer wall at an edge of the floor surface 112. The first rim 113 may be formed to be integral with the floor surface 112 by a method such as injection-molding or the like.

The second rim 114 may form an intermediate wall between the first rim 113 and the accommodation hole 111. The second rim 114 may be formed to be integral with the floor surface 112 by a method such as injection-molding or the like and may be formed to have the same height as the first rim 113 with respect to the floor surface 112.

One or more slits 115 may be formed to be recessed from the second rim 114 toward the floor surface 112.

When flows of foreign substances and/or a fluid due to gravity are considered, the floor surface 112 may be disposed to have a predetermined angle with respect to a bottom of the vehicle, the slits 115 may be formed in a direction that is close to the bottom of the vehicle in the second rim 114, and the slits 115 may be formed to be recessed in the second rim 114 to have the same depth as a depth of the floor surface 112.

Further, in order to effectively discharge the foreign substances and/or fluid in a direction from the accommodation hole 111 toward the first rim 113, a width of each of the slits 115 may become smaller from an inner surface to an outer surface of the second rim 114, that is, in the direction of the first rim 113.

Further, for the purpose, the accommodation hole 111 may be formed to be higher than a height of the first rim 113 or the second rim 114 with respect to the floor surface 112 to more effectively prevent the foreign substances and/or fluid from being introduced between the pinion shaft 10 and the accommodation hole 111.

Further, the accommodation hole 111 may be formed to be stepped at least once such that a height of the accommodation hole becomes smaller in a direction of the second rim 114. The structure also prevents the foreign substances and/or fluid from being introduced into the accommodation hole 111.

Meanwhile, in the embodiment of the present invention, the accommodation hole 111 may be formed at a height that may be exposed above the dashboard. As mentioned above, the dust cap 100 for a steering system according to the embodiment of the present invention is coupled to the dashboard of a vehicle. Here, when the accommodation hole 111 is formed at the height exposed above the dashboard, there is an advantage of preventing the foreign substances and/or fluid introduced through a through part, which is formed in the dashboard such that one end of the pinion shaft 10 is exposed, from being introduced between the pinion shaft 10 and the accommodation hole 111.

In order to discharge the foreign substances and/or fluid which flow while passing through the slits 115 from a direction of the accommodation hole 111 to the outside, one or more vent holes 116 may be formed in the floor surface 112 between the first rim 113 and the second rim 114.

Further, in order to effectively discharge the foreign substances and/or fluid in a direction from the accommodation hole 111 toward the first rim 113, the vent holes 116 may be formed in the same direction as a circumferential direction formed by a rotational axis of the pinion shaft 10 and the slits 115.

Further, the vent holes 116 may be formed in the floor surface 112 that is closer to the first rim 113 than to the second rim 114.

Meanwhile, wo more coupling protrusions 117 of hook shapes are formed in an outward direction of the first rim 113, and a dust packing 130 that is coupled to the coupling protrusions 117 to shield a space formed by the first rim 113 and the second rim 114 may be further included.

Since the dust packing 130 may be formed of a rubber material and an upper surface thereof is formed to come in contact with the dashboard (not illustrated) and the like, the upper surface of the dust packing may be formed in a wrinkled shape to effectively prevent the foreign substances and fluid from being introduced.

In summary, the present invention includes a structure of the dust packing 130, by which the foreign substances and/or fluid are prevented from being introduced in a direction of the pinion shaft 10, and thus there is an advantage that the foreign substances and/or fluid can be effectively discharged to the outside through organic coupling of the accommodation hole 111, the first rim 113, the second rim 114, the slits 115, and the vent holes 116, which are formed in the upper part 110 of the dust cap 100, even though the foreign substances and/or fluid are finely introduced.

It will be understood by an ordinary person in the art that the present invention may be variously changed and modified without departing from the technical spirit of the present invention, and the technical scope of the present invention should not be limited by the contents described in the embodiment but should be determined by the claims and the equivalents thereof.

The invention claimed is:

1. A dust cap for a steering system which has an accommodation hole for accommodating a pinion shaft and of which a lower part is coupled to a rack housing, the dust cap comprising:
- a floor surface formed to extend to an outside of the accommodation hole from an upper part thereof;
- a first rim extended from an edge of the floor surface so as to form an outer wall at the edge of the floor surface;
- a second rim formed on the floor surface between the first rim and the accommodation hole so as to form an intermediate wall between the first rim and the accommodation hole;
- one or more slits formed in the second rim and recessed toward the floor surface from the second rim; and
- one or more vent holes formed on the floor surface between the first rim and the second rim,
- wherein the accommodation hole is formed to be higher than a height of the first rim or the second rim with respect to the floor surface and to be stepped such that a height of the accommodation hole becomes smaller in a direction of the second rim.

2. The dust cap of claim 1, wherein the dust cap for a steering system is configured to be coupled to a dashboard and the accommodation hole is formed at a height exposed above the dashboard.

3. The dust cap of claim 1, wherein the floor surface is disposed to have a predetermined angle with respect to a bottom of a vehicle body, and the one or more slits are formed in a direction that is close to the bottom of the vehicle body in the second rim.

4. The dust cap of claim 1, wherein the one or more vent holes are formed in the same direction as a circumferential direction formed by a rotational axis of the pinion shaft and the one or more slits.

5. The dust cap of claim 1, wherein a depth of the one or more slits is the same as the floor surface.

6. The dust cap of claim 1, wherein a width of the one or more slits becomes smaller toward the first rim.

7. The dust cap of claim 1, wherein two or more coupling protrusions of a hook shape are formed in an outward direction of the first rim and a dust packing coupled to the two or more coupling protrusions to shield a space formed by the first rim and the second rim is further included.

8. The dust cap of claim 7, wherein the dust packing is formed of a rubber material and an upper surface of the dust packing is formed in a wrinkled shape.

* * * * *